US005355972A

United States Patent [19]

Wataya

[11] Patent Number: 5,355,972

[45] Date of Patent: Oct. 18, 1994

[54] CONTROL DEVICE FOR A SUCKED AIR QUANTITY OF AN ENGINE

[75] Inventor: Seiji Wataya, Himeji, Japan

[73] Assignee: Mitsubishi Denki Kabushiki Kaisha, Tokyo, Japan

[21] Appl. No.: 29,164

[22] Filed: Mar. 10, 1993

[30] Foreign Application Priority Data

Apr. 21, 1992 [JP] Japan .................................. 4-100940

[51] Int. Cl.5 ............................................. B60K 15/00

[52] U.S. Cl. ..................................... 180/68.3; 60/706; 123/319; 123/332

[58] Field of Search ..................... 180/68.2, 68.3, 178, 180/179; 60/906; 123/319, 324, 327, 332, 333, 340

[56] References Cited

FOREIGN PATENT DOCUMENTS 62-35040 2/1987 Japan .
62-75048 4/1987 Japan .
62-91644 4/1987 Japan .

*Primary Examiner*—Richard M. Camby
*Attorney, Agent, or Firm*—Sughrue, Mion, Zinn, Macpeak and Seas

[57] ABSTRACT

A control device for a sucked air quantity of an engine comprises an accelerator pedal opening degree sensor for detecting an opening degree of an accelerator pedal; a throttle valve opening degree sensor for detecting an opening degree of a throttle valve; a throttle valve actuator for controlling the opening degree of the throttle valve in accordance with outputs of both the accelerator pedal opening degree sensor and the throttle valve opening degree sensor; a first fully-closed state detecting switch for detecting a fully-closed state of the accelerator pedal; a second fully-closed state detecting switch for detecting a fully-closed state of the throttle valve; and an abnormality determining means for determining that the control device for a sucked air quantity is abnormal when the throttle valve is not in the fully-closed state in case that the accelerator pedal is in the fully-closed state.

1 Claim, 5 Drawing Sheets

CONTROL DEVICE FOR A SUCKED AIR QUANTITY OF AN ENGINE

BACKGROUND OF THE INVENTION

Field of the Invention

The present invention relates to a control device for a sucked air quantity of an engine for controlling a throttle valve to regulate a sucked air quantity of an engine for a vehicle, particularly to its failsafe performance.

Discussion of Background

Generally speaking, a sucked air quantity of a gasoline engine is controlled by opening and closing a throttle valve by mechanically coworking with an accelerator pedal. In recent times, a so-called drive-by-wire system is partially reduced to practice wherein a throttle valve is controlled to open and close by an electrically controlled actuator, with the purpose of promoting the drive feeling, providing also a function of an actuator for constant-speed running and promoting the layout performance in mounting.

FIG. 2 shows the construction of a conventional device, wherein a reference numeral 1 designates an engine, 2, a throttle valve for controlling a sucked air quantity of the engine 1, and 3, a throttle valve actuator for driving the throttle valve 2, which is composed of a DC motor, a stepping motor or the like. A numeral 4 designates a throttle valve opening degree sensor for detecting an opening degree of the throttle valve 2, 5, an accelerator pedal, 6, an accelerator pedal opening degree sensor for detecting an opening degree of the accelerator pedal 5, 7, a revolution number sensor for detecting a revolution number of the engine 1, and 8, a control unit for controlling to drive the throttle valve actuator based on various input informations, which is composed of input interfaces 81 and 82, a microcomputer 83 and an output interface 84.

Next, an explanation will be given of the operation of the above construction by a flowchart of FIG. 3. Although calculation, determination or the like to be explained below is performed by the microcomputer 83, since this is widely known, a detailed explanation will be omitted. First, in step 100, the operation reads an output of the accelerator pedal opening degree sensor 6 which varies by coworking with the accelerator pedal 5. In step 101, the operation calculates a target throttle valve opening degree $\theta_S$. In the calculation, the operation previously determines how the throttle valve opening degree corresponds to the accelerator pedal opening degree $\alpha$, and provides the target throttle valve opening degree $\theta_S$ from a predetermined function and a correction thereto.

Although the relationship between the accelerator pedal opening degree $\alpha$ and the target throttle valve opening degree $\theta_S$, changes depending on how to determine a power performance of a vehicle with respect to the accelerator pedal opening degree $\alpha$, there is a characteristic thereof as shown in FIG. 4, as a general example. A characteristic curve a in FIG. 4 shows a case wherein the target throttle valve opening degree $\theta_S$ changes in proportion to the accelerator pedal opening degree $\alpha$, whereas a characteristic curve b shows a case wherein the change of the target throttle valve opening degree $\theta_S$ is relaxed in the low opening degree region of the accelerator pedal opening degree $\alpha$.

The purpose of the characteristic curve b is to improve a phenomenon wherein a shock is caused when the change of the sucked air quantity is large in starting the vehicle to move or when the vehicle is running at a low speed, or a fine control thereof is difficult. Furthermore, as shown in FIG. 5, an output torque of the engine 1 is not uniform with respect to a revolution number $N_e$ of an engine, and lowers in regions of a low revolution number and a high revolution number. Therefore, it is possible to improve a feeling of deficiency of the output torque due to the regions of revolution number of an engine, by correcting the characteristic curve b through an opening degree correction coefficient shown in FIG. 5. The relationship between the accelerator pedal opening degree $\alpha$ and the target throttle valve opening degree $\theta_S$ above is only an example, and may be different depending on a character (smoothness, sporty feeling) of the vehicle or a function of the engine.

In step 102, the operation reads an actual throttle valve opening degree $\theta_r$ from the throttle valve opening degree sensor 4. In step 103, the operation calculates a difference e between the target throttle valve opening degree $\theta_S$ and the actual throttle valve opening degree $\theta_r$. When e is positive or when the actual throttle valve opening degree $\theta_r$ is smaller than the target throttle valve opening degree $\theta_S$, the operation proceeds to step 104a, and drives the throttle valve actuator 3 to the side of opening it in accordance with the difference e. When $\theta_r$ is larger than $\theta_S$, the operation proceeds to step 104b, and drives the throttle valve actuator 3 to the side of closing it.

Accordingly, it is possible to perform a control having high freedom by opening and closing the throttle valve 2 by the throttle valve actuator 3. Furthermore, it is possible to add thereto a function of constant-speed running by feeding back a vehicle speed signal. However, in electrically controlling the throttle valve 2, different from the case wherein the throttle valve 2 is opened and closed by mechanically coworking with the accelerator pedal 5, there may be cases wherein the throttle valve 2 is not operable by a failure of the throttle valve actuator 3, the control unit 8 or the like, which causes a wild running of the vehicle. Therefore, the failsafe performance thereof becomes extremely important.

FIG. 6 is a flowchart showing the operation of determining whether the whole control system of the throttle valve actuator 3 is normal or not and the operation after the determination. In step 200, the operation reads the accelerator pedal opening degree $\alpha$ provided by the accelerator pedal opening degree sensor (APS) 6 and the actual throttle valve opening degree $\theta_r$ provided by the throttle valve opening degree sensor (TPS) 4. In step 201, the operation determines whether a difference e between $\alpha$ and $\theta_r$ is larger than a previously determined criterion $e_l$. When the difference e is smaller than the criterion $e_l$, in step 202, the operation determines that the control system is normal, and in step 203, performs a normal control.

When $e<e_l$, in step 204, the operation determines that the control system of the throttle valve actuator 3 is abnormal, and performs cutting off fuel or generating alarm for evading the abnormality in step 205. The cutting off fuel is performed for all the cylinders of the engine 1 or for a number of cylinders. The criterion $e_l$ is determined by considering the difference between the accelerator pedal opening degree $\alpha$ and the target throttle valve opening degree $\theta_s$, and also considering the accuracies of the accelerator pedal opening degree sensor 6 and the throttle valve opening degree sensor 4.

The conventional device described above has an effect for the malfunction of the throttle valve actuator 3 or the malfunction of the driving unit of the throttle valve actuator 3 in the control unit 8. However, the conventional device can not be expected to have an effect for the failure of the accelerator pedal opening degree sensor 6, the throttle valve opening degree sensor 4, or the input interfaces 81 and 82 or the microcomputer 83 in the control unit 8 which process the output signals of these sensors. Accordingly, for instance, when the output signal of the accelerator pedal opening degree sensor 6 corresponding to the pushed-on quantity of the accelerator pedal 5, does not show a normal value and outputs a rather large value, the throttle valve opening degree becomes large against the intention of a driver, and a wild running such as a full acceleration may be caused although depending on cases.

Such a disadvantageous phenomenon can be caused also by the failure in a memory or the like in the microcomputer 83. Furthermore, when the output signal indicates a value which is abnormally smaller than the normal value, by the malfunction of the throttle valve opening degree sensor 4, the throttle valve opening degree becomes abnormally large by a feedback control of the throttle valve opening degree, which also is a danger amounting to the wild running. In the conventional device, it is not possible to detect the failure although depending on the failure mode of the throttle valve opening degree sensor 4, the accelerator pedal opening degree sensor 6 or the control unit 8, which is a problem in view of safety.

SUMMARY OF THE INVENTION

It is an object to solve the above problem and to provide a control device for a sucked air quantity of an engine capable of preventing the wild running due to an abnormal opening operation of a throttle valve when an abnormality is caused.

According to an aspect of the present invention, there is provided a control device for a sucked air quantity of an engine comprising:

- an accelerator pedal opening degree sensor for detecting an opening degree of an accelerator pedal;
- a throttle valve opening degree sensor for detecting an opening degree of a throttle valve;
- a throttle valve actuator for controlling the opening degree of the throttle valve in accordance with outputs of both the accelerator pedal opening degree sensor and the throttle valve opening degree sensor;
- a first fully-closed state detecting switch for detecting a fully-closed state of the accelerator pedal;
- a second fully-closed state detecting switch for detecting a fully-closed state of the throttle valve; and
- an abnormality determining means for determining that the control device for a sucked air quantity is abnormal when the throttle valve is not in the fully-closed state in case that the accelerator pedal is in the fully-closed state.

In this invention, the operation determines that the device is abnormal when the throttle valve is not in a fully-closed state in case that a driver does not push on the accelerator pedal. Therefore, the wild running by the abnormal opening operation of the throttle valve can be prevented beforehand.

DETAILED DESCRIPTION OF THE PREFERRED EMBODIMENT

Figure 1:
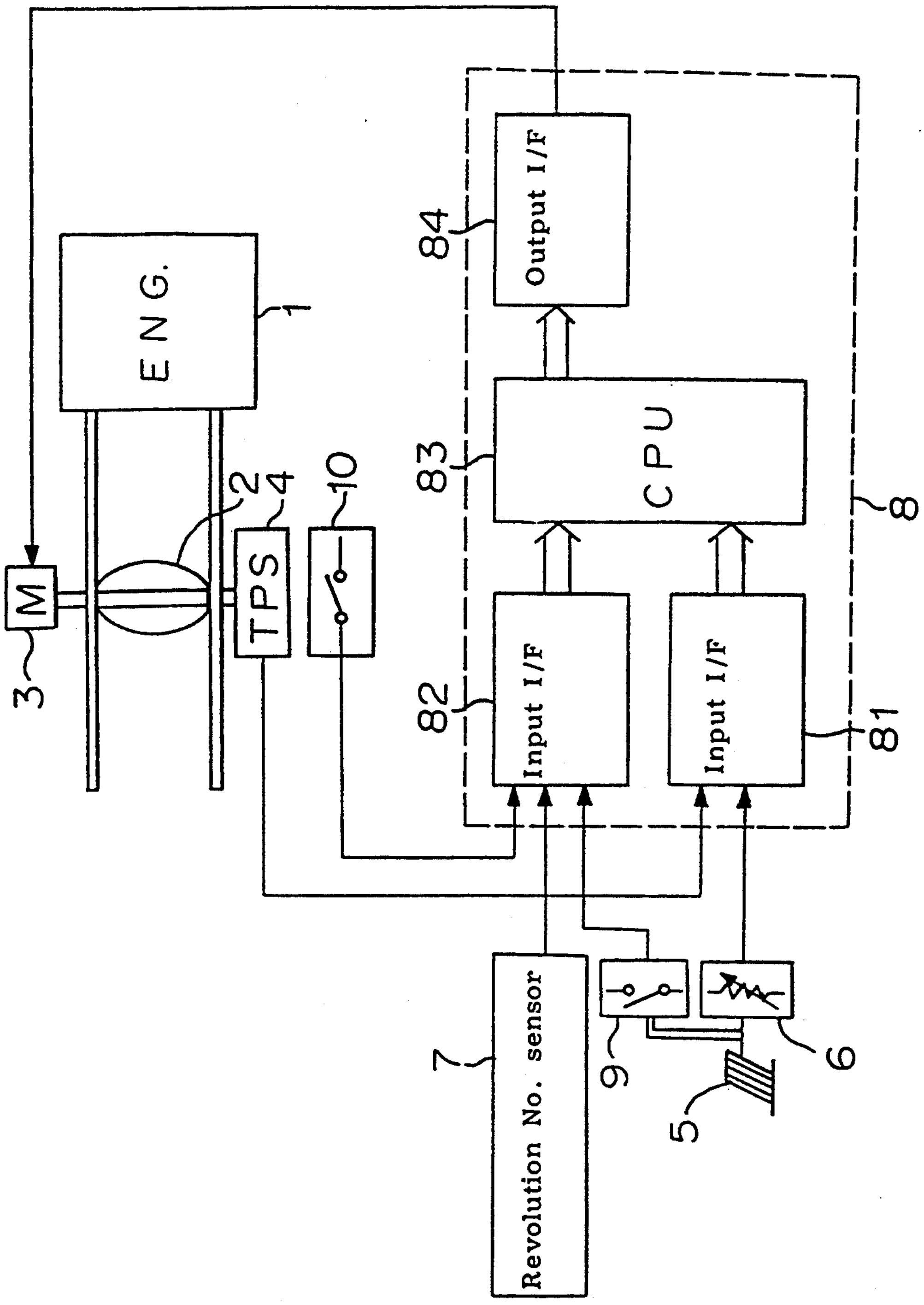
FIG. 1 is a construction diagram of an invented device.
Figure 2:
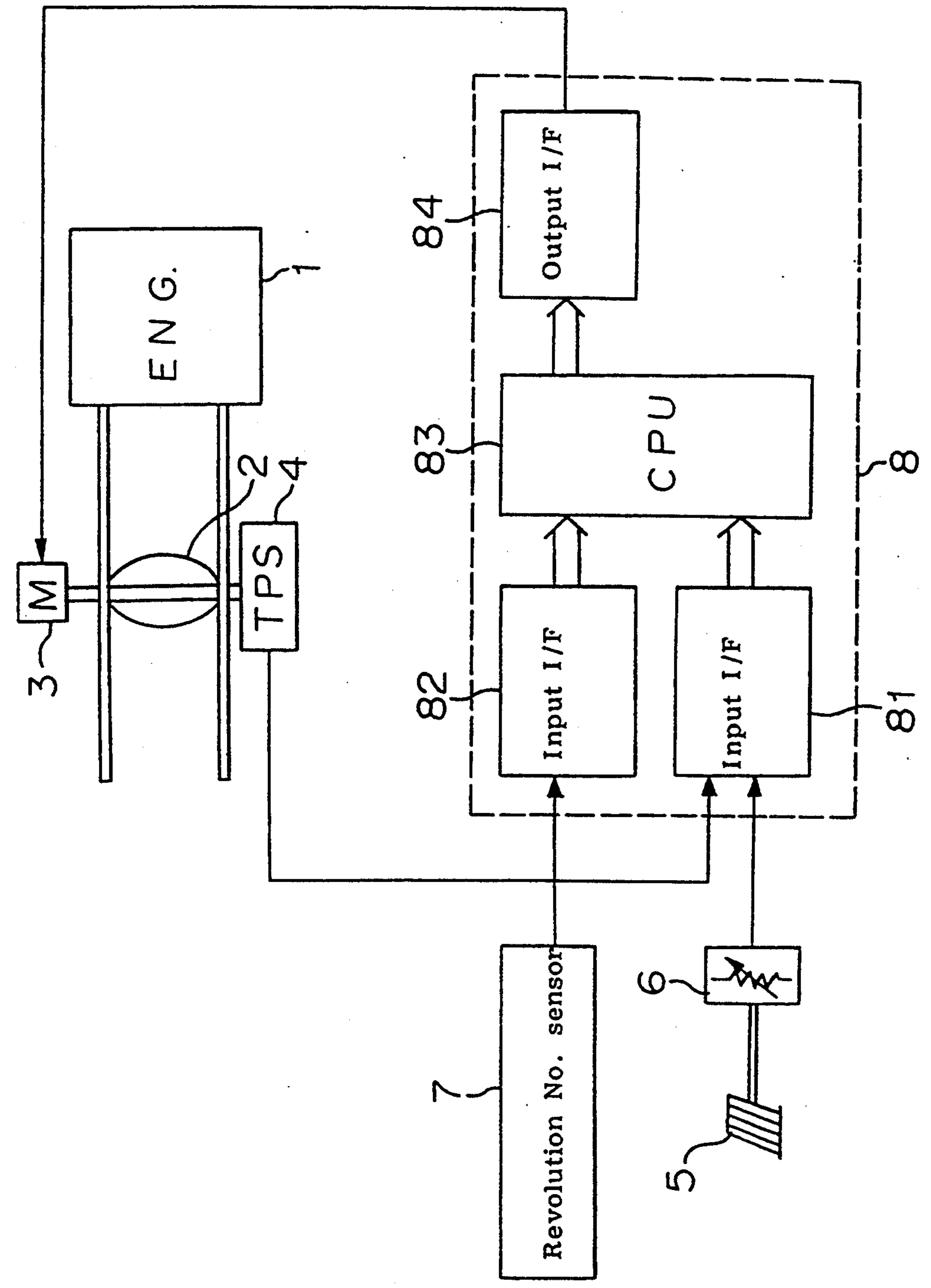
FIGURE 2 PRIOR ART
FIG. 2 is a construction diagram of a conventional device.
Figure 3:
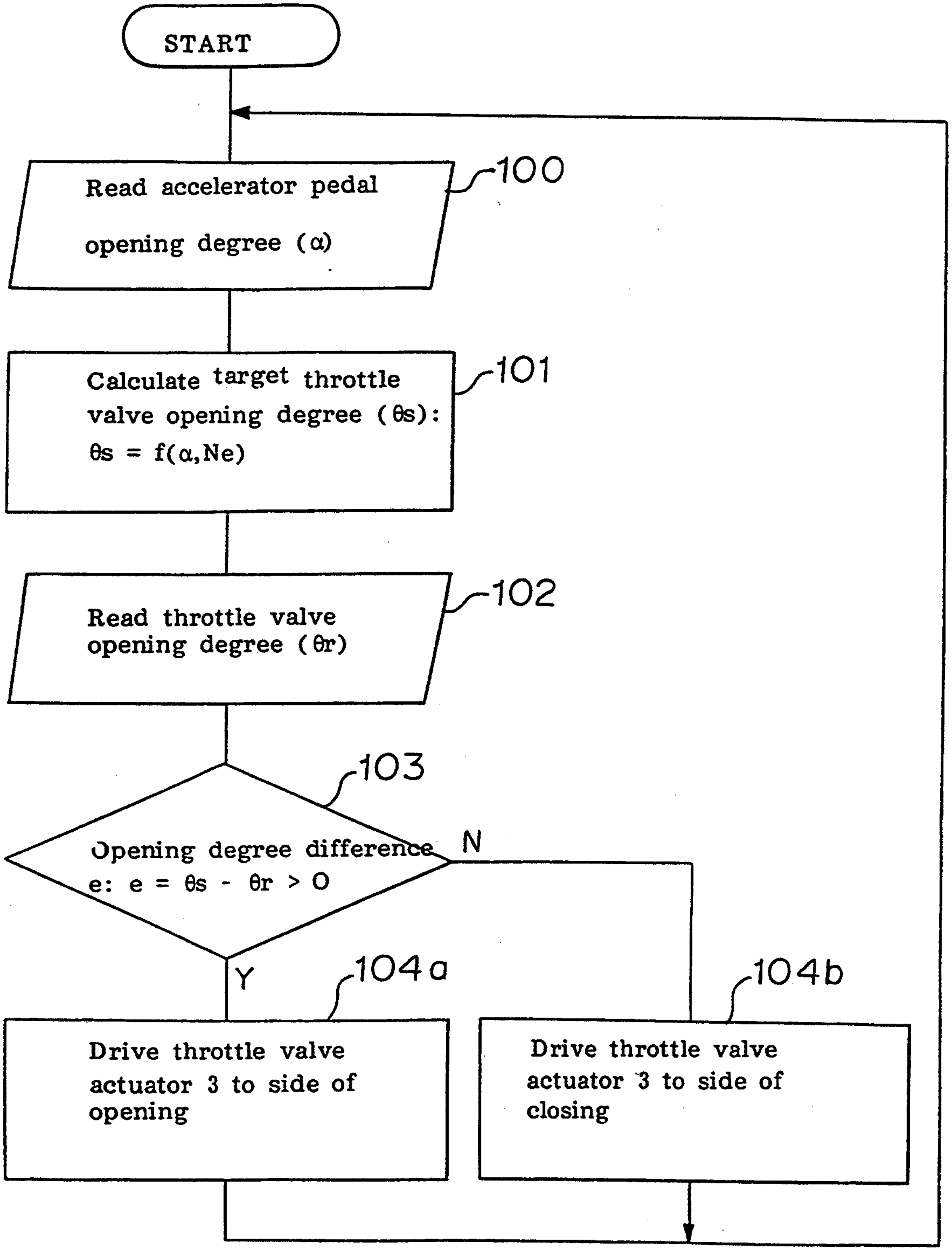
FIG. 3 is a flowchart showing an operation of controlling a throttle valve.
Figure 4:
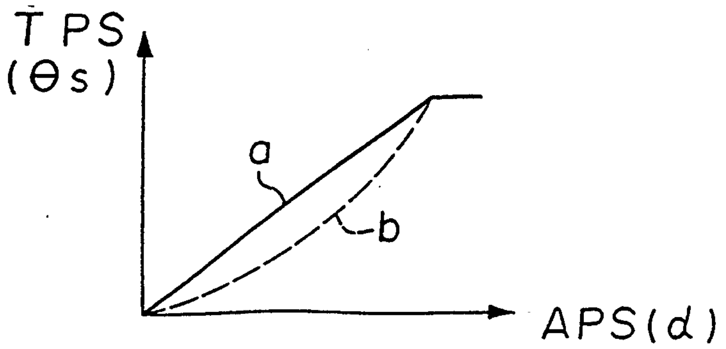
FIG. 4 is a diagram showing a relationship between an accelerator pedal opening degree and a target throttle valve opening degree.
Figure 5:
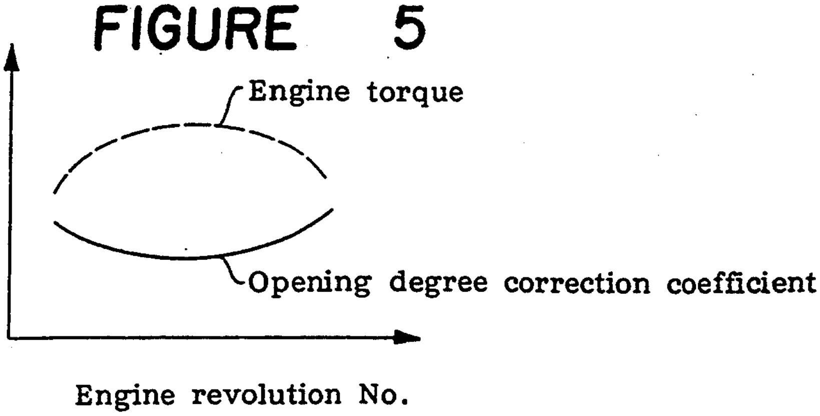
FIG. 5 is a diagram showing a relationship between a revolution number of an engine and a torque of the engine.
Figure 6:
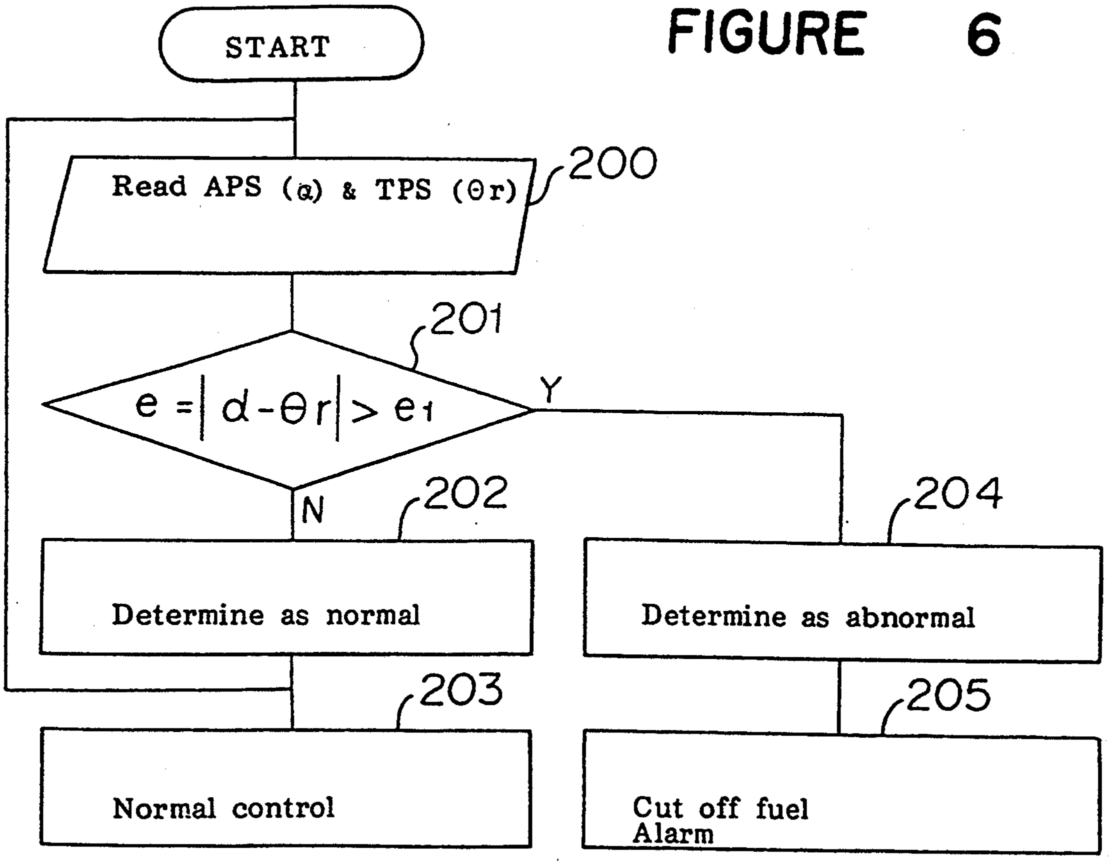
FIG. 6 is a flowchart showing an operation of determining abnormality in the conventional device.

An explanation will be given of an embodiment of this invention referring to the drawings, as follows. FIG. 1 shows the construction of this embodiment, wherein a reference numeral 9 designates a fully-closed state detecting switch for detecting a fully-closed state of the accelerator pedal 5, and 10, a fully-closed state detecting switch for detecting a fully-closed state of the throttle valve 2, and the other construction is the same as in the conventional device.

Figure 7:
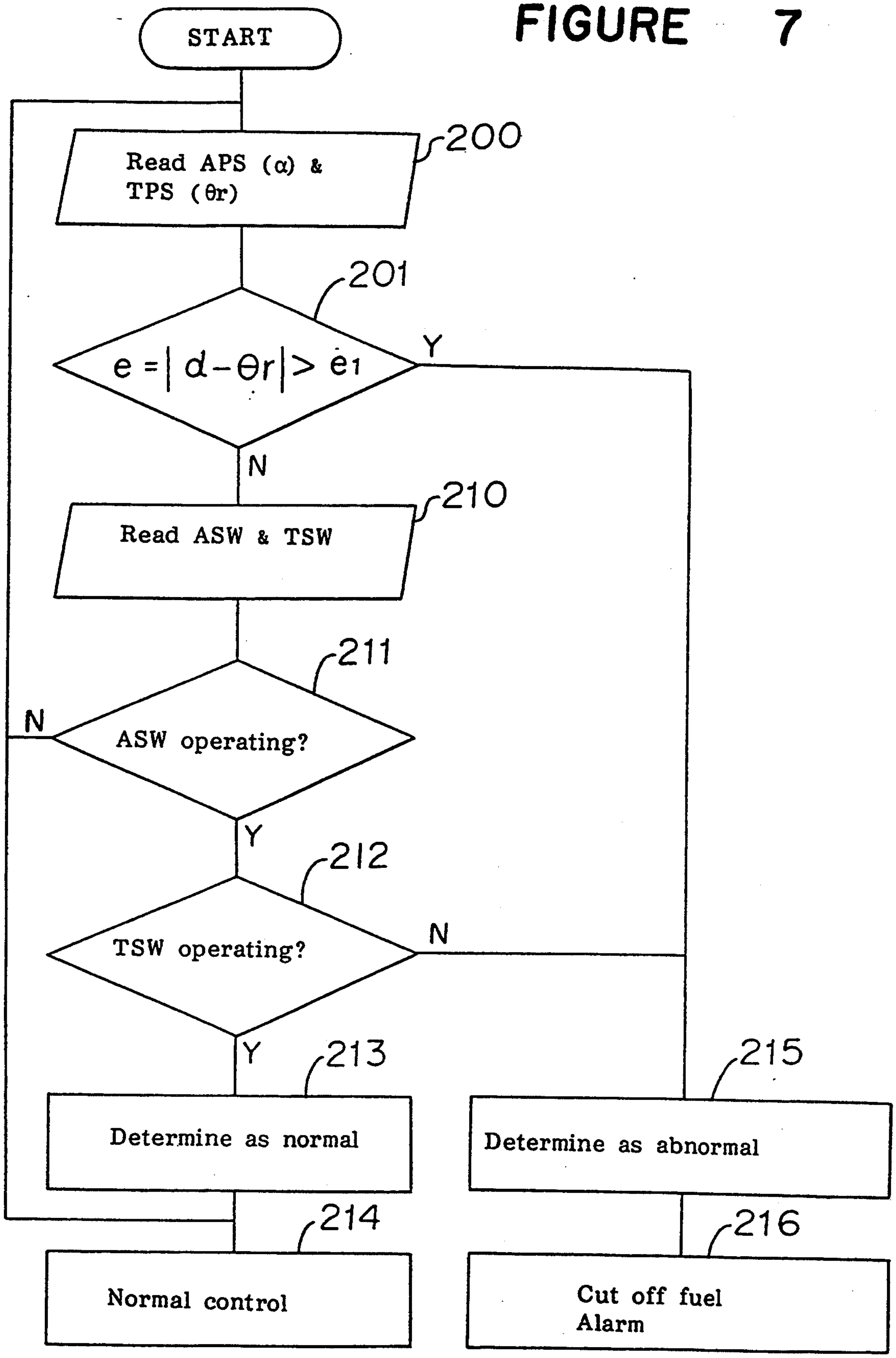
FIG. 7 is a flowchart showing the operation of determining abnormality of the invented device.

Next, an explanation will be given of the operation of detecting abnormality in the throttle valve control system of the invented device by a flowchart of FIG. 7. In step 200, the operation reads the accelerator pedal opening degree $\alpha$ provided by the accelerator pedal opening degree sensor 6 and the throttle valve opening degree $\theta_r$ provided by the throttle valve opening degree sensor 4. In step 201, the operation determines whether the difference e between $\alpha$ and $\theta_r$ is larger than the criterion $e_l$. When the difference e is larger than the criterion $e_l$, in step 215, the operation determines that the device is abnormal, and in step 216, performs cutting off the total or the partial fuel and alarming. When the difference e is smaller than the criterion $e_l$, the operation proceeds to step 210, and reads ON-OFF states of the fully-closed state detecting switch (ASW) 9 of an accelerator pedal and the fully-closed state detecting switch (TSW) 10 Of the throttle valve. In step 211, the operation determines whether the fully-closed state detecting switch 9 of the accelerator pedal is operating (fully-closed state of the accelerator pedal). When the fully-closed state detecting switch 9 is operating, the operation determines whether the fully-closed state detecting switch 10 is operating (fully-closed state of the throttle valve 2) in step 212. When the fully-closed. state detecting switch 10 is operating, the operation determines that the device is normal in step 213, and performs a normal control in step 214. When the fully-closed state detecting switch 10 of the throttle valve is not operating, the operation determines that the device is abnormal in step 215, and cuts off the total or the partial fuel supply, and generates an alarm to the driver in step 216.

Furthermore, in the determination of disagreement in the operations of the fully-closed state detecting switch 9 of the accelerator pedal and the fully-closed state detecting switch 10 of the throttle valve, since the throttle valve operates more or less retardedly compared to that of the accelerator pedal even under the normal operating condition, it is preferable to provide a little delay time in the determination of abnormality so that the disagreement in a very short time is not to be determined as abnormal. Furthermore, the fully-closed state detecting switch 10 of the throttle valve may be provided in the throttle valve opening degree sensor 4. The fully-closed state detecting switch 9 of the accelerator pedal may be provided in the accelerator pedal opening degree sensor 6. Furthermore, the fully-closed state detecting switch 9 of the accelerator pedal 9 and the fully-closed state detecting switch 10 of the throttle valve may be of contact switches or of noncontact switches.

As stated above, according to the present invention, the fully-closed state detecting switches are provided to the accelerator pedal and to the throttle valve, respectively, as a failsafe measure of the so-called drive-by-wire system wherein the throttle valve is electrically controlled. The control system of the throttle valve is determined as abnormal when the throttle valve is not fully closed in spite of the fully-closed state of the accelerator pedal, and measures such as cutting off feel or the like are performed. Accordingly, even when the failure amounting to the worst case of the wide running, is caused by the malfunction of the throttle valve actuator or the opening degree sensors, in case that the throttle valve is not fully-closed when the driver does not push on the accelerator pedal, the determination of abnormality is performed, thereby avoiding the danger. In this way, the failure detection can be performed by a simple construction wherein only two fully-closed switches are added to the device, and the wild running by the abnormal opening operation of the throttle valve, can be prevented.

What is claimed is:

1. A control device for a sucked air quantity of an engine comprising:

an accelerator pedal opening degree sensor for detecting an opening degree of an accelerator pedal;

a throttle valve opening degree sensor for detecting an opening degree of a throttle valve;

a throttle valve actuator for controlling the opening degree of the throttle valve in accordance with outputs of both the accelerator pedal opening degree sensor and the throttle valve opening degree sensor;

a first fully-closed state detecting switch for detecting a fully-closed state of the accelerator pedal;

a second fully-closed state detecting switch for detecting a fully-closed state of the throttle valve; and an abnormality determining means for determining that the control device for a sucked air quantity is abnormal when the throttle valve is not in the fully-closed state when the accelerator pedal is in the fully-closed state.

* * * * *